1,616,070

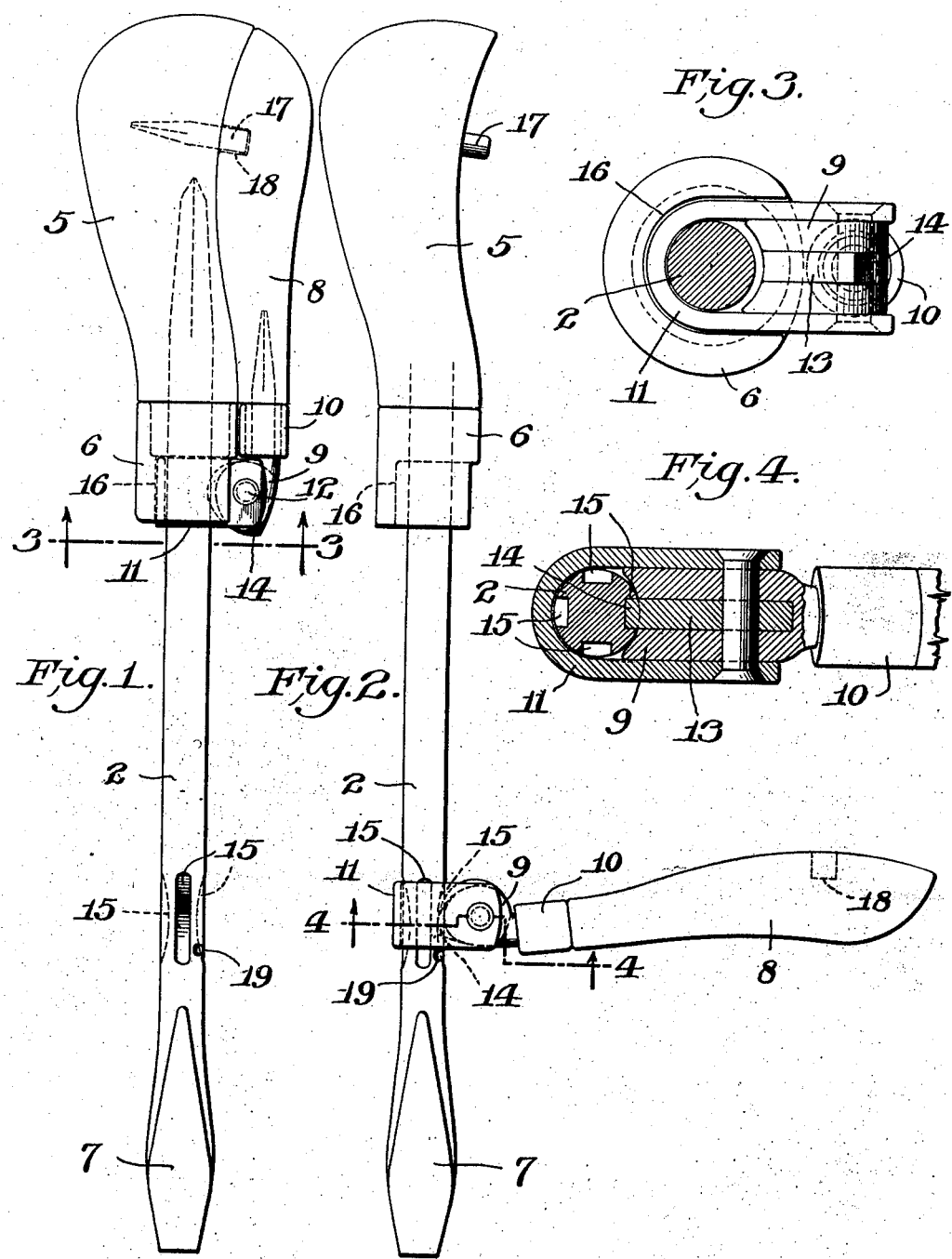
Feb. 1, 1927.
C. F. WAHL
SCREW DRIVER
Original Filed Feb. 6, 1924
1,616,070
INVENTOR:
Charles F. Wahl
BY
ATTORNEY Patented Feb. 1, 1927.

UNITED STATES PATENT OFFICE.

CHARLES F. WAHL, OF WILMINGTON, DELAWARE.

SCREW DRIVER.

Application filed February 6, 1924, Serial No. 690,915. Renewed December 15, 1926.

This invention relates to improvements in screw drivers and other tools having shanks and handles.

The object of the invention is to provide a tool shank with a main handle fixed to one end portion thereof and a supplemental handle movable relatively to the main handle in combination with a novel, simple and efficient construction and arrangement of parts which will permit the two handles to be used as a single handle when the supplemental handle is in a normal position adjacent to the main handle, and which will permit the supplemental handle to be moved from its normal position and engaged with the shank close to the tool carried thereby to act as a lever for turning the shank while pressure is applied to one or both handles longitudinally of the shank to hold the tool against the object with which it is engaged.

With the foregoing and related objects in view, the invention consists in the novel construction, combination and arrangement of parts hereinafter described and claimed.

In the accompanying drawings, illustrating the invention,

Figure 1 is a side view of screw driver embodying my invention, showing the supplemental handle in the normal position.

Figure 2 is a view similar to Fig. 1, showing the supplemental handle lowered from the normal position.

Figure 3 is a transverse section through the device, on line 3—3 of Fig. 1.

Figure 4 is a section through the shank and a part of the supplemental handle, on line 4—4 of Fig. 2.

Referring to the drawings, 2 designates a tool shank and 5 a main handle fixed on the upper end portion thereof. The shank 2 is driven into the handle 5 and the handle 5 is provided with a ferrule 6 which surrounds the lower portion thereof and the adjacent portion of the shank 2.

The lower end portion of the shank 2 may be in the form of any suitable tool. As herein illustrated, it is formed into a screw-driving bit 7.

The supplemental handle 8 is provided with a projecting arm 9 one end of which is driven into the body of the handle 8. A suitable ferrule 10 surrounds a portion of the handle 8 and arm 9. The projecting portion of the arm 9 is fitted between the side arms of a U-shaped member 11 which embraces the shank 2, and the member 11 is rotatable and slidable longitudinally on the shank 2. The handle arm 9 is pivotally connected to the member 11 by a pin 12 which has its end portions riveted into the side arms of the member 11. The pivot pin 12 also serves to hold in place within a slot in the arm 9 a plate 13 having a tooth 14 which projects from the arm 9, the handle 8, arm 9, and tooth 14 being rigidly connected and forming in effect, a solid, integral structure.

Formed in the lower portion of the shank 2 some distance below the main handle 5 are a plurality of notches 15 which are arranged around the shank, as shown. The tooth 14 is adapted to enter any one of the notches 15 as and for a purpose presently described.

When the supplemental handle 8 is in the normal position, shown in Fig. 1, the member 11 is housed within an opening 16 in the lower portion of the ferrule 6, the wall of which serves to prevent the member 11 from turning on the shank 2.

The main handle 5 has a pin 17 driven into the same and projecting therefrom. The projecting portion of the pin 17 is adapted to enter an opening 18 in the supplemental handle 8 and prevent any pressure against the supplemental handle when it is in the normal position from moving it longitudinally of the shank; and the pin 17 also serves to prevent the upper portion of the supplemental handle from being displaced by pressure laterally of the main handle.

After the supplemental handle 8 is moved outwardly on its pivot 12 to move its opening 18 from the pin 17, the handle 8 and member 11 may be moved longitudinally on the shank 2, the main handle 5 limiting the upward movement thereof, and the downward movement thereof being limited by the projecting ends of a stop pin 19 which extends transversely through the shank 2.

The operation of the device is as follows:

When the supplemental handle 8 is in the raised or normal position shown in Fig. 1, it and the main handle 5 form, in effect, a single handle which may be grasped by hand and used in the usual manner when the screw driver is in ordinary use.

When, however, it is desired to exert a great downward pressure and a great turning pressure in loosening a tight screw or in tightening a screw in its work, the supplemental handle 8 is moved on its pivot 12 to move its opening 18 from the pin 17 and the handle 8 and member 11 are moved down on the shank 2 until the member 11 rests against the stop pin 19. The handle 8 is then turned around the shank 2 until the tooth 14 comes into registry with one of the notches 15. The handle 8 is then moved still further on its pivot until the tooth 14 enters the notch 15 and bears against the base wall thereof which forms a stop to limit the outward and downward movement of the handle 8, as shown in Fig. 2.

In this position of the parts downward pressure may be exerted against the two handles 5 and 8, and, at the same time, the supplemental handle may be operated as a lever to exert great turning pressure against the shank. After the shank has been turned a given distance, the handle 8 may be raised slightly to disengage the tooth 14 from the shank 2 and then the handle 8 may be turned back until the tooth 14 comes into registry with another notch 15, whereupon it may be engaged therewith and the turning operation previously described repeated. It will thus be understood that the supplemental handle 8 may be operated as a ratchet in turning the shank 2.

I claim as my invention:—

In a device of the character described, the combination of a tool shank having a handle on one end portion thereof and provided with a plurality of notches spaced from said handle, and a supplemental handle movable on the shank from a normal position adjacent to the first named handle to a position adjacent to said notches and provided with means adapted to enter any one of said notches to cause the shank to move with the supplemental handle, and a pin projecting from the first named handle and entering an opening in the supplemental handle and preventing the latter handle from being moved longtudinally of the shank when the supplemental handle is in the normal position.

In testimony whereof I affix my signature hereto.

CHARLES F. WAHL.